US012623949B2

(12) United States Patent
Kladias et al.

(10) Patent No.: US 12,623,949 B2
(45) Date of Patent: May 12, 2026

(54) OPTICAL FIBER DRAW PRODUCTION SYSTEMS, PRESSURE DEVICES AND METHODS APPLYING PRESSURE TO OPTICAL FIBER

(71) Applicant: Corning Incorporated, Corning, NY (US)

(72) Inventors: Nikolaos Pantelis Kladias, Horseheads, NY (US); Ming-Jun Li, Horseheads, NY (US); Bruce Warren Reding, Corning, NY (US); Pushkar Tandon, Painted Post, NY (US); Kevin Lee Wasson, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 688 days.

(21) Appl. No.: 17/974,135

(22) Filed: Oct. 26, 2022

(65) Prior Publication Data

US 2023/0132984 A1 May 4, 2023

Related U.S. Application Data

(60) Provisional application No. 63/273,390, filed on Oct. 29, 2021.

(51) Int. Cl.
*C03B 37/025* (2006.01)
*C03B 37/029* (2006.01)
(52) U.S. Cl.
CPC ........ *C03B 37/0253* (2013.01); *C03B 37/029* (2013.01); *C03B 2205/10* (2013.01); *C03B 2205/72* (2013.01)

(58) Field of Classification Search
None
See application file for complete search history.

(56) References Cited

U.S. PATENT DOCUMENTS

| | | | |
|---|---|---|---|
| 7,937,971 B2 | 5/2011 | Costello et al. | |
| 10,370,281 B2 | 8/2019 | Ono et al. | |
| 2001/0037663 A1* | 11/2001 | Ganan-Calvo | C03B 37/027 |
| | | | 65/495 |
| 2018/0111871 A1* | 4/2018 | Jewell | C03B 37/02718 |
| 2023/0212057 A1* | 7/2023 | Mukasa | C03B 37/027 |
| | | | 65/398 |
| 2024/0375991 A1* | 11/2024 | Ishikawa | C03B 37/0253 |

OTHER PUBLICATIONS

Ono et al., "Significant suppression of Rayleigh scattering loss in silica glass formed by the compression of its melted phase", Optics Express, 26 (7), 7942 (2018), 7 pages.
Yang et al., "Topological pruning enables ultra-low Rayleigh scattering in pressure-quenched silica glass", npj Computation Materials 6, 139 (2020), 8 pages.

* cited by examiner

*Primary Examiner* — Lisa L Herring
(74) *Attorney, Agent, or Firm* — Yiqun Zhao

(57) ABSTRACT

Optical fiber draw production systems, pressure devices, and methods of fabrication of optical fiber are disclosed. In one embodiment, a method of forming an optical fiber includes heating a preform to draw the optical fiber through a draw furnace, and passing the optical fiber through a pressure device while the optical fiber is still forming, wherein a pressure within the pressure device is greater than an atmospheric pressure.

21 Claims, 16 Drawing Sheets

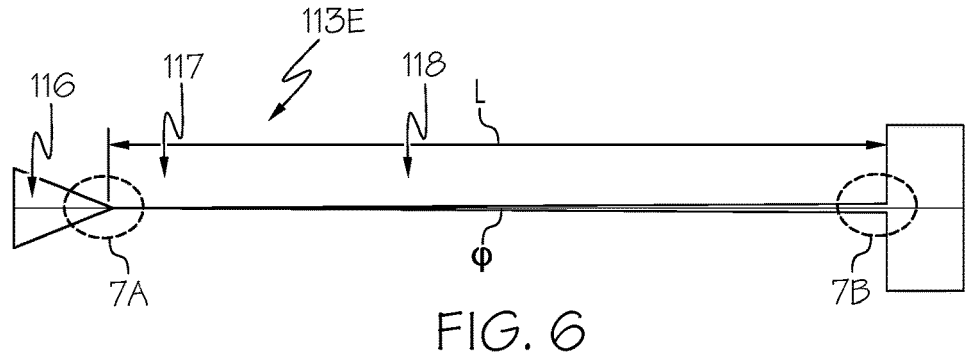
FIG. 6
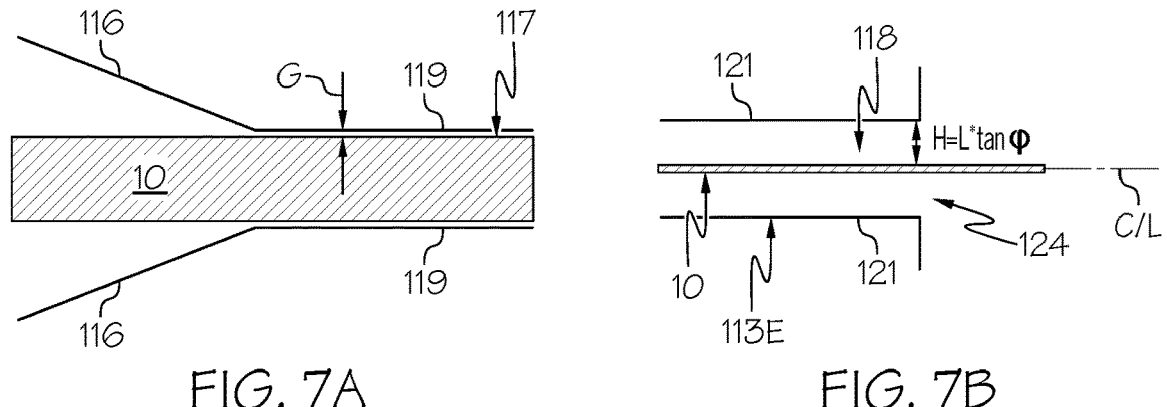
FIG. 7A                    FIG. 7B
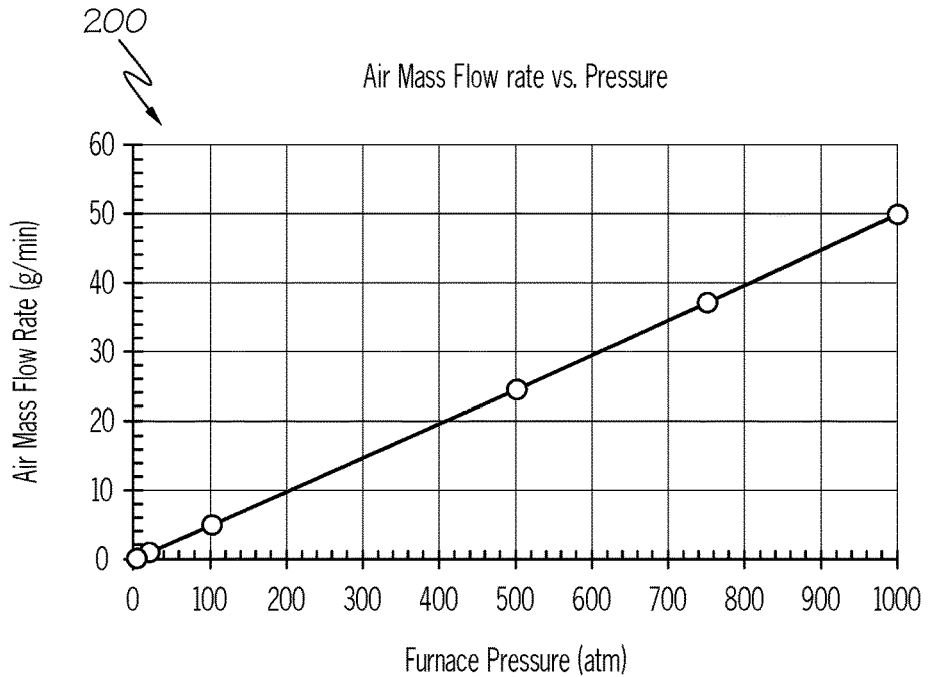
FIG. 8

602

| | 1 | 2 | 3 | 4 | 5 | 6 | 7 | 8 | 9 | 10 |
|---|---|---|---|---|---|---|---|---|---|---|
| ▨ Section 1 | -1.03 | 0.259 | 0.328 | 0.389 | 0.445 | 0.495 | 0.546 | 0.607 | 0.687 | 0.844 |
| ▧ Section 2 | 1.040 | -0.40 | -0.71 | -0.82 | -0.93 | -1.03 | -1.13 | -1.24 | -1.31 | -0.81 |

604

610

| | 1 | 2 | 3 | 4 | 5 | 6 | 7 | 8 | 9 | 10 |
|---|---|---|---|---|---|---|---|---|---|---|
| ▨ Section 1 | -1.01 | 0.922 | 0.917 | 1.068 | 1.198 | 1.336 | 1.498 | 1.700 | 1.994 | 2.605 |
| ▨ Section 2 | 0.640 | -1.65 | -1.92 | -2.20 | -2.46 | -2.74 | -3.08 | -3.52 | -4.16 | -0.92 |

611

| | 1 | 2 | 3 | 4 | 5 | 6 | 7 | 8 | 9 | 10 |
|---|---|---|---|---|---|---|---|---|---|---|
| ▨ Section 1 | -0.71 | 0.918 | 0.710 | 0.837 | 0.924 | 1.028 | 1.155 | 1.319 | 1.565 | 2.058 |
| ▨ Section 2 | 0.576 | -2.16 | -2.14 | -2.42 | -2.68 | -2.98 | -3.36 | -3.86 | -4.62 | -1.45 |

OPTICAL FIBER DRAW PRODUCTION SYSTEMS, PRESSURE DEVICES AND METHODS APPLYING PRESSURE TO OPTICAL FIBER

FIELD

This Application claims the benefit of priority to U.S. Provisional Patent Application Ser. No. 63/273,390, filed on Oct. 29, 2021, the content of which is relied upon and incorporated herein by reference in its entirety.

BACKGROUND

The present disclosure is directed to the production of optical fiber and, more particularly, to the production of optical fiber having reduced Rayleigh scattering.

Optical fiber is increasingly being used for a variety of applications, including but not limited to broadband voice, video, and data transmission. As bandwidth demands increase optical fiber is migrating deeper into communication networks such as in fiber-to-the-premises applications such as FTTx, 5G, and the like.

However, traditional optical fiber inherently induces optical loss in optical signals that propagate within the optical fiber. This optical loss produces signal degradation that can affect network performance. One source of optical loss is the presence of structural voids within the optical fiber that cause Rayleigh scattering and overall signal attenuation.

Consequently, there exists an unresolved need for optical fiber draw production systems and methods of optical fiber production that reduce the presence of structural voids.

SUMMARY

The present disclosure is directed to optical fiber draw production systems, pressure devices, and methods of fabrication of optical fiber that apply pressure to the optical fiber immediately following the draw furnace and at or near the point of optical fiber formation to reduce the presence of structural voids in the formed optical fiber.

In one embodiment, a method of processing an optical fiber includes drawing an optical fiber from a preform and directing the optical fiber in a downstream direction along a process pathway. The optical fiber has a forming point at a first position along the process pathway, the optical fiber having a forming point temperature $T_{fp}$ at the forming point. The method further includes subjecting the optical fiber to an applied pressure greater than 10 atm at a second position along the process pathway. The second position is upstream of the first position, and the optical fiber has a temperature Ti at the second position, wherein $T_{fp}-150°$ C.$\leq T_1 \leq T_{fp}+100°$ C.

In another embodiment, a fiber draw production system includes a draw furnace and a pressure device. The draw furnace is operable to draw an optical fiber from a preform in a downstream direction along a process pathway. The optical fiber has a forming point at a first position along the process pathway. The optical fiber having a forming point temperature $T_{fp}$ at the forming point. As a non-limiting example, the optical fiber may have a forming point temperature $T_{fp}$ between 1500° C. and 1700° C., including endpoints. The pressure device is downstream from the draw furnace and is operable to receive an optical fiber from the draw furnace and subject the optical fiber to an applied pressure greater than 10 atm at a second position along the process pathway. The second position is upstream of the first position, and the optical fiber having a temperature Ti at the second position, wherein $T_{fp}-150°$ C.$\leq T_1 \leq T_{fp}+100°$ C.

In yet another embodiment, a pressure device for applying pressure to an optical fiber drawn from a draw furnace along a process pathway includes a pressure chamber having an entrance end and an exit end. The optical fiber has a forming point at a first position along the process pathway and a forming point temperature $T_{fp}$ at the forming point. The pressure device also includes an entrance nozzle at the entrance end, an exit nozzle at the exit end, and a tapered inlet fluidly coupled to the entrance nozzle. The tapered inlet has a taper angle of less than or equal to 5 degrees. The pressure device is operable to receive the optical fiber at a second position along the process pathway. The second position is upstream of the first position, and the optical fiber has a temperature Ti at the second position, where $T_{fp}-150°$ C.$\leq T_1 \leq T_{fp}+100°$ C.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure and are incorporated into and constitute a part of this specification. The drawings illustrate various embodiments and together with the description serve to explain the principles and operation.

BRIEF DESCRIPTION OF THE FIGURES

FIG. 6 schematically illustrates an exit nozzle of a pressure device according to one or more embodiments described and illustrated herein;

FIG. 7A schematically illustrates a close-up view of an air bearing component of the exit nozzle depicted in FIG. 6 according to one or more embodiments described and illustrated herein;

FIG. 7B schematically illustrates an end of a tapered exit of the exit nozzle depicted in FIG. 6 according to one or more embodiments described and illustrated herein;

FIG. 8 is a graph plotting air mass flow rate as a function of pressure within the pressure device according to one or more embodiments described and illustrated herein;

DETAILED DESCRIPTION

Figure 1:
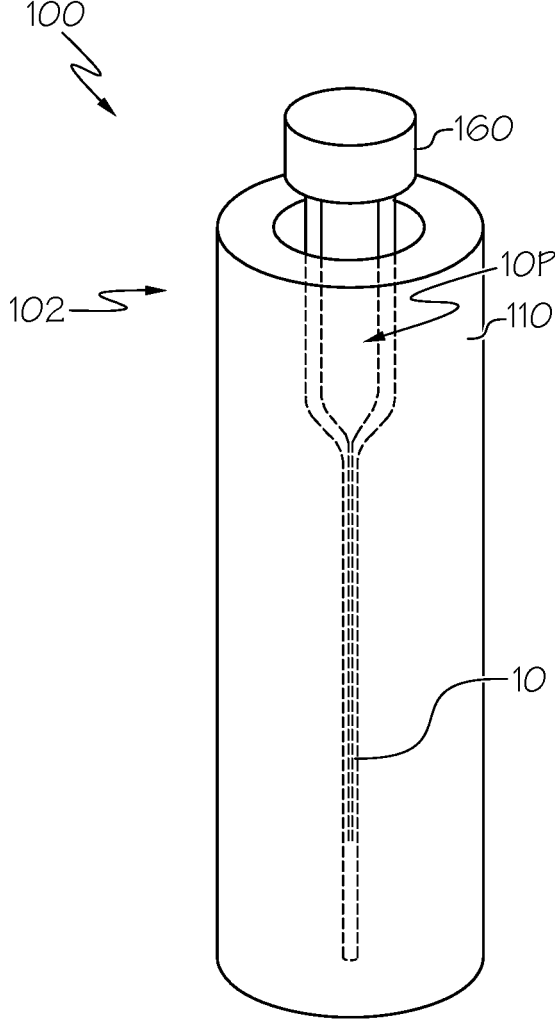
FIG. 1 schematically illustrates a perspective view of an optical fiber production system having a pressure device according to one or more embodiments described and illustrated herein.

References will now be made in detail to the embodiments of the disclosure, examples of which are illustrated in the accompanying drawings. Whenever possible, like reference numbers will be used to refer to like components or parts.

The present disclosure is directed to optical fiber draw production systems, pressure devices, and methods of fabrication of optical fiber that apply pressure to the optical fiber immediately following the draw furnace and at or near the point of optical fiber formation to reduce the presence of structural voids in the formed optical fiber. Structural voids within the optical fiber cause undesirable Rayleigh scattering and overall signal attenuation. In the optical fiber draw process, an optical fiber is formed from bulk glass (e.g. a preform) by heating the bulk glass to softening and drawing (pulling) an optical fiber from the softened glass through the action of gravity and application of a draw tension. One strategy for reducing the presence of structural voids in glass is to apply pressure to the glass to rearrange or densify the glass structure to remove or minimize structural voids. Although compression of bulk glass may reduce structural voids within the bulk glass, it has been determined herein that the suppression of structural voids in the bulk glass is reversible when the bulk glass is heated above the softening point and subsequently cooled. Therefore, structural voids may reappear in optical fiber drawn from bulk glass (e.g. a preform) upon cooling of the optical fiber during the fiber draw process even if structural voids in the bulk glass (e.g., a preform) had been suppressed by pressurization prior to initiating the fiber draw.

Unless otherwise specified, the temperature is expressed herein in units of ° C. (degrees Celsius).

The term "process pathway" refers to the pathway traversed by an optical fiber in an optical fiber draw process.

The relative position of one process unit relative to another process unit along the process pathway is described herein as upstream or downstream. The upstream direction of the process pathway is the direction toward the preform and the downstream direction of the process pathway is the direction toward the winding stage. Positions or processing units upstream from a reference position or processing unit are closer, along the process pathway, to the preform than the reference position or processing unit. A process unit located at a position closer to the draw furnace along the process pathway is said to be upstream of a process unit located at a position further away from the draw furnace along the process pathway. The draw furnace is upstream from all other process units and the take-up spool (or winding stage or other terminal unit) is downstream of all other process units.

By way of example, the process pathway of an optical fiber in an illustrative draw process extends from a draw furnace to a pressure device to a cooling unit, from the cooling unit to a coating application unit, from the coating application unit to a coating curing unit, and from the coating curing unit to a take-up spool. In the context of the terminology used herein, the draw furnace is upstream of the pressure device, which is upstream of the cooling unit, which is upstream of the coating application unit, which is upstream from the coating curing unit, which is upstream of the take-up spool. Similarly, the take-up spool is downstream of the coating curing unit, which is downstream of the coating application unit, which is downstream of the cooling unit, which is downstream of the pressure device, which is downstream of the draw furnace.

The term "residence time" refers to the time in which an optical fiber is present within a process unit (or specified portion thereof) of an optical fiber draw process. Unless otherwise specified, residence time is defined as the ratio of the distance traversed by the optical fiber in a process unit (or specified portion thereof) to the speed of motion (draw speed) of the optical fiber within the process unit (or a specified portion thereof). The distance traversed by the optical fiber in a process unit (or a specified portion thereof) corresponds to the distance, as measured along the process pathway, between the position of entrance of the optical fiber to the process unit (or specified portion thereof) and the position of exit of the fiber from the process unit (or specified portion thereof).

The term "optical fiber" refers to a glass waveguide. The glass waveguide includes a glass core and a glass cladding. The glass cladding surrounds and is directly adjacent to the glass core. The glass cladding may include two or more concentric glass regions that differ in refractive index. The refractive index of the glass core is greater than the refractive index of the glass cladding (or the average refractive index of the glass cladding when the glass cladding includes multiple concentric regions) at a wavelength of 1550 nm.

As used herein, "forming point" refers to the position along the process pathway at which the diameter of the optical fiber is at its ultimate stable dimension. An optical fiber at or downstream of the forming point is said to be "fully formed" and has a diameter that is fixed and invariant as the optical fiber progresses further downstream along the process pathway. The forming point is typically about the softening point of the glass (e.g., about 1670° C. for silica coverclad glass).

An optical fiber upstream of the forming point is said to be "forming" and has a diameter that varies as the optical fiber progresses in the downstream direction. More specifically, while the optical fiber is forming, its diameter decreases as it moves in the downstream direction. As discussed more fully below, optical fibers are produced in a draw process in which a glass preform is heated to soften it. In particular, the end of the glass preform is heated and as it softens, the action of gravity and an applied tension are used to draw an optical fiber. The cross-sectional dimension of the heated end portion of the preform is substantially greater than the preferred diameter of the optical fiber. As the optical fiber is drawn, it initiates motion in the downstream dimension. As it moves away from the preform, it thins and narrows in diameter. At the same time, however, the fiber cools, its viscosity increases, and the fiber becomes more rigid and resistant to changes in diameter. The forming point is the point at which the diameter of the optical fiber becomes fixed at its ultimate value. The temperature of the optical fiber at the forming point is referred to herein as the "forming point temperature" of the optical fiber and is given the symbol $T_{fp}$.

Embodiments of the present disclosure apply high pressure (e.g., 1000 atm) to the optical fiber in an optical fiber draw process at a position downstream of the draw furnace. More particularly, embodiments employ a pressure device that applies pressure to the optical fiber without the optical fiber physically contacting any component of the pressure device or other components of the optical fiber draw production system.

Pressure is preferably applied to the optical fiber by the pressure device while the optical fiber is at an elevated temperature. In some embodiments, pressure is applied to the optical fiber when the optical fiber is at or near its forming point, where the forming point is the position along the draw pathway downstream of the draw furnace at which the diameter of the optical fiber has stabilized and no longer decreases as the optical fiber moves further away from the draw furnace (downstream direction of motion). Embodiments further provide centering forces on the optical fiber to ensure no physical contact between it and structures of the optical fiber draw production system.

Various embodiments of optical fiber draw production systems, pressure device, and methods for forming optical fiber that apply a pressure to an optical fiber during fiber formation to reduce or eliminate structural voids are described in detail below.

Referring now to FIG. 1, an example drawing system 100 for drawing an optical fiber 10 is schematically illustrated. The system generally includes a preform holder 160, a draw furnace 102 and a pressure device 110. The preform holder 160 is located adjacent to a top side of the draw furnace 102 and holds a preform 10P used to form the optical fiber 10. The preform 10P is then heated at one end by the draw furnace 102 and drawn into the optical fiber 10 using the drawing system 100. The drawing process for the optical fiber 10 may include a core and a cladding as is known in the art.

Unlike conventional drawing systems, the drawing systems of the embodiments of the present disclosure include a pressure device 110 that applies a pressure to the optical fiber proximate the forming point of the optical fiber 10 or downstream of the forming point. Thus, the pressure device 110 is located downstream from the draw furnace 102 at a second position when the optical fiber 10 has a temperature T1. As used herein, the "optical fiber temperature T1" is the temperature of the optical fiber 10 at the entrance of the pressure device 110. As non-limiting examples, the pressure device 110 is located downstream from the draw furnace 102 such that the optical fiber temperature T1 at the entrance to the pressure device 110 is greater than 1500° C., greater than 1600° C. or greater than 1700° C. As further non-limiting examples, the pressure device 110 is located with downstream from the draw furnace 102 at a second position such that $T_{fp}-150°$ C.$\leq T_1 \leq T_{fp}+100°$ C., $T_{fp}-50°$ C.$\leq T_1 \leq T_{fp}+50°$ C., $T_{fp}-25°$ C.$\leq T_1 \leq T_{fp}+25°$ C., or $T_{fp}-50°$ C.$\leq T_1 \leq T_{fp}+100°$ C.

While not wishing to be bound by theory, the pressure provided by the pressure device 110 on the optical fiber 10 is thought to decrease structural voids within the optical fiber 10. The application of pressure to the optical fiber as disclosed herein leads to reductions in the Rayleigh scattering and overall attenuation in the optical fiber compared to traditional drawing methods. As non-limiting examples, the pressure devices and methods described herein enable the production of optical fibers wherein the fiber attenuation is less than 0.175 dB/km at 1550 nm, less than 0.165 dB/km at 1550 nm, less than 0.155 dB/km at 1550, or less than 0.145 dB/km at 1550 nm. As further non-limiting examples, the pressure devices and methods described herein enable the production of optical fibers wherein the fiber attenuation is less than 0.31 dB/km at 1310 nm, less than 0.29 dB/km at 1310 nm, less than 0.27 dB/km at 1310, or less than 0.25 dB/km at 1310 nm. As further non-limiting examples, the pressure devices and methods described herein enable the production of optical fibers having a Rayleigh scattering coefficient of less than 0.87 dB/km/micron$^4$ less than 0.82 dB/km/micron$^4$, less than 0.77 dB/km/micron$^4$, or less than 0.72 dB/km/micron$^4$. As further non-limiting examples, the pressure devices and methods described herein enable the production of optical fibers having a Rayleigh scattering coefficient reduction of greater than 4%, greater than 8%, greater than 12%, or greater than 16% compared to an optical fiber drawn under identical conditions but without application of pressure by a pressure device.

In the embodiment of FIG. 1, pressure device 110 is shown as being immediately adjacent to draw furnace 102. In other embodiments, pressure device 110 is spaced apart from draw furnace 102 so that a gap is present between pressure device 110 and draw furnace 102.

In some embodiments, the pressure within the pressure device 110 is greater than 100 atm, greater than 200 atm, greater than 500 atm, or greater than 1000 atm. Pressure within the pressure device 110 may be provided by providing gas into the pressure device 110. Gases used in the pressure device may be, without limitation, nitrogen, air, oxygen, krypton, argon, helium, xenon or a combination thereof.

In some embodiments, the gas flow rate into the pressure device 110 is less than 100 g/min, less than 75 g/min, or less than 50 g/min. In some embodiments, the temperature of the gas inside the high pressure nozzle device is between 10° C. and 1100° C., between 15° C. and 500° C., between 20° C. and 200° C., or at room temperature. As a non-limiting example, depending on the pressurizing gas temperature the fiber can cool from 1700° C. to a temperature between 1000° C. and 1300° C.

Figure 2:
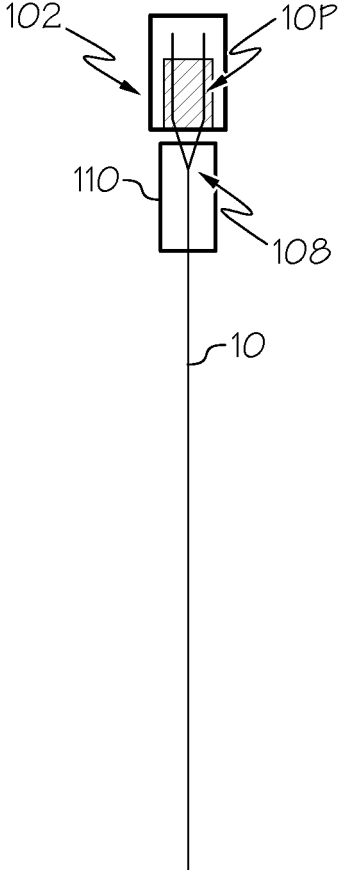
FIG. 2 schematically illustrates another view of an optical fiber production system having a pressure device according to one or more embodiments described and illustrated herein.

Referring now to FIG. 2, a simplified schematic view of the drawing system 100 illustrated by FIG. 1 is depicted. As a non-limiting example, after exiting the draw furnace 102, the optical fiber (or optical fiber root 108) enters the pressure device 110 at a temperature between 1500° C. and 1750° C.; however, embodiments are not limited to such a temperature range. It is desirable to pass the optical fiber through the pressure device 110 at or just downstream from the formation point of the optical fiber 10. In some embodiments, the draw speed of the optical fiber is greater than 5 m/s, greater than 20 m/s, or greater than 40 m/s. However, embodiments are not limited by any particular draw speed. In some embodiments, the residence time of fiber inside the pressure device 110 (and the time period over which the optical fiber 10 is subjected to high pressure) is greater than 5 ms, greater than 10 ms, or greater than 40 ms, or in a range from 5 ms to 100 ms, or in a range from 10 ms to 75 ms, or in a range from 15 ms to 50 ms.

The pressure within the pressure device is expected to minimize the presence of voids within the optical fiber 10 and/or reduce the diameter of any voids, thereby reducing the Rayleigh scattering and optical attenuation within the optical fiber 10. Without being bound by theory, it is believed that the hydrostatic pressure applied on the voids of the optical fiber 10 by the pressure device 110 is able to overcome the pressure forces in these voids, with the rate of collapse determined by the balance of the work done by the applied forces and the viscous dissipation in the glass. The collapse of the voids reduces the scattering from these sites and hence the overall attenuation in the fiber. Because the pressure device 110 is provided downstream from the draw furnace 102 and the optical fiber 10 will not be reheated to temperatures sufficient to reverse the effect of pressure downstream of the pressure device 110, the reduction of voids induced within the optical fiber 10 in the pressure device 110 is permanent.

Figure 3:
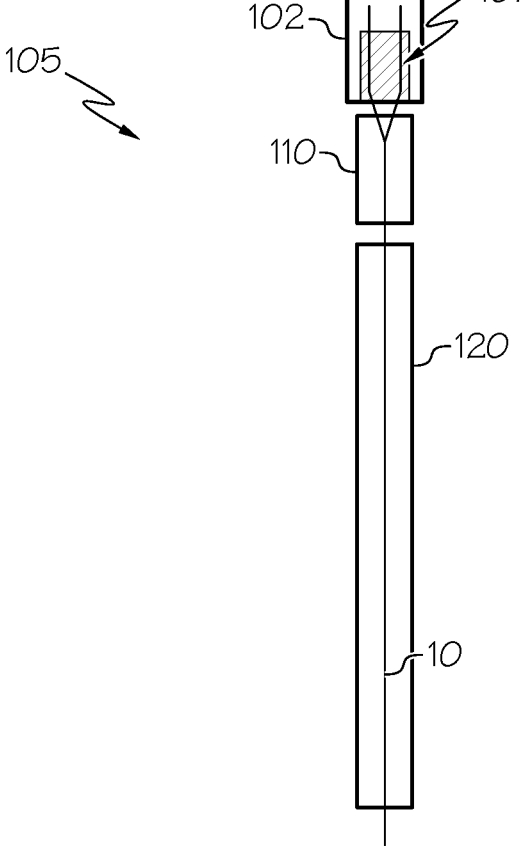
FIG. 3 schematically illustrates another optical fiber production system that includes a pressure device and a cooling device according to one or more embodiments described and illustrated herein.

Additional components may be provided downstream from the pressure device 110. Referring now to FIG. 3, another drawing system 105 for forming an optical fiber 10 with reduced Rayleigh scattering is schematically illustrated. The drawing system 105 of FIG. 3 is similar to the drawing system of FIGS. 1 and 2 except it includes a slow cooling device 120 downstream from the pressure device 110 along the path of the optical fiber being drawn. The slow cooling device reduces the cooling rate of the optical fiber 10 within the glass transition region. The lower cooling rate increases the structural relaxation of the glass, thereby reducing the fictive temperature of the glass and hence results in optical fibers with reduced Rayleigh scattering and attenuation.

Embodiments are not limited by the temperature of the optical fiber 10 as it enters and exits the slow cooling device 120. The temperature of the optical fiber 10 when it enters the slow cooling device 120 is less than or equal to the temperature of the optical fiber 10 when it exits pressure device 110. In embodiments, the temperature of the optical fiber 10 when it enters the slow cooling device 120 is at least 25° C., or at least 50° C., at least 100° C., at least 200° C., or in a range from 25° C. to 200° C., or in a range from 25° C. to 150° C., or in a range from 50° C. to 150° C. less than the temperature of the optical fiber 10 when it exits pressure device 110. As a non-limiting example, the optical fiber 10 may enter the slow cooling device 120 at a fiber temperature between 1400° C. and 1650° C., including endpoints, and exit the slow cooling device 120 at a fiber temperature between 800° C. and 1300° C., including endpoints. As a further non-limiting example, the temperature of the optical fiber 10 entering the slow cooling device 120 is between 1600° C. and 1800° C., between 1500° C. and 1700° C., or between 1300° C. and 1600° C. As yet another non-limiting example, the temperature of the optical fiber as it enters the slow cooling device 120 is $T_1$–100° C. As a further non-limiting example, the operating temperature within the slow cooling device 120 is between 800° C. and 1300° C., including endpoints, and a residence time of the optical fiber 10 within the slow cooling device 120 is less than 0.5 seconds. As another non-limiting example, the cooling rate of the optical fiber inside the slow cooling device is less than 5000° C./sec.

To reduce the footprint of the drawing system or to extend the process pathway within a given footprint of a drawing system, one or more fiber air turn (or fluid bearing) devices may be provided to turn the optical fiber as it traverses the process pathway. In one embodiment, an air turn device reverses the direction of the optical fiber; for example, the air turn device may turn an optical fiber moving in a downward vertical direction away from the draw furnace 102 upward in a vertical direction back toward the draw furnace 102.

Figure 4:
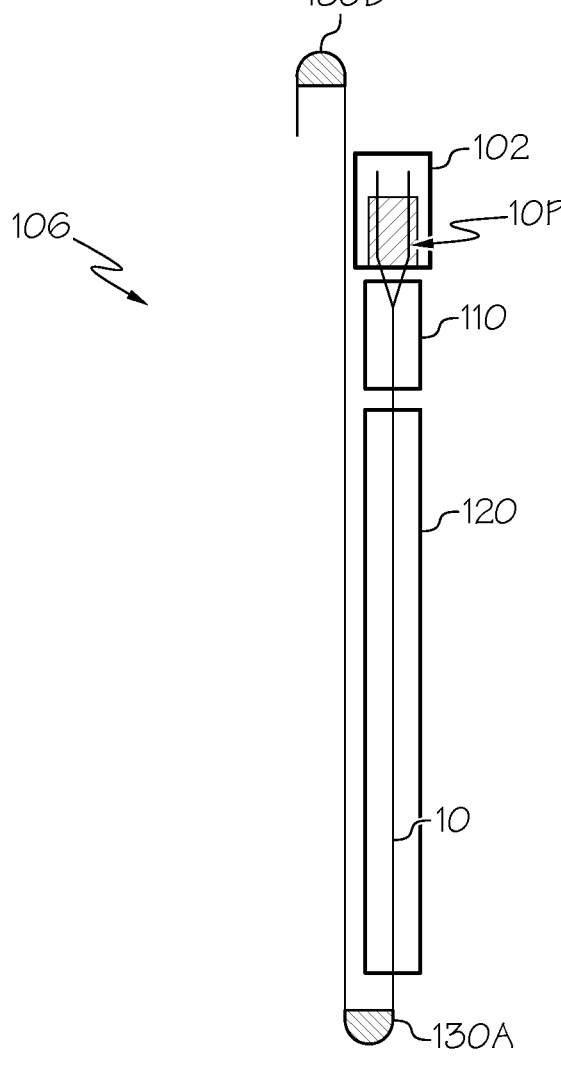
FIG. 4 schematically illustrates another optical fiber production system that includes a pressure device, a cooling device, and air turns according to one or more embodiments described and illustrated herein.

Referring now to FIG. 4, another example drawing system 106 is schematically illustrated. The drawing system 106 includes a first air turn device 130A and a second air turn device 130 that turn the optical fiber 10. Air turn devices 130A and 130B turn the optical fiber 10 without physically contacting the optical fiber 10, as physical contact between the optical fiber 10 and any solid surface of the drawing system may break or damage the optical fiber 10. The air turn devices 130A and 130B may be configured as any known or yet-to-be-developed air turn component. See, for example, U.S. Pat. No. 7,937,971, the disclosure of which is incorporated by reference herein.

It should be understood that additional components may be provided in the drawing system.

Figure 5:
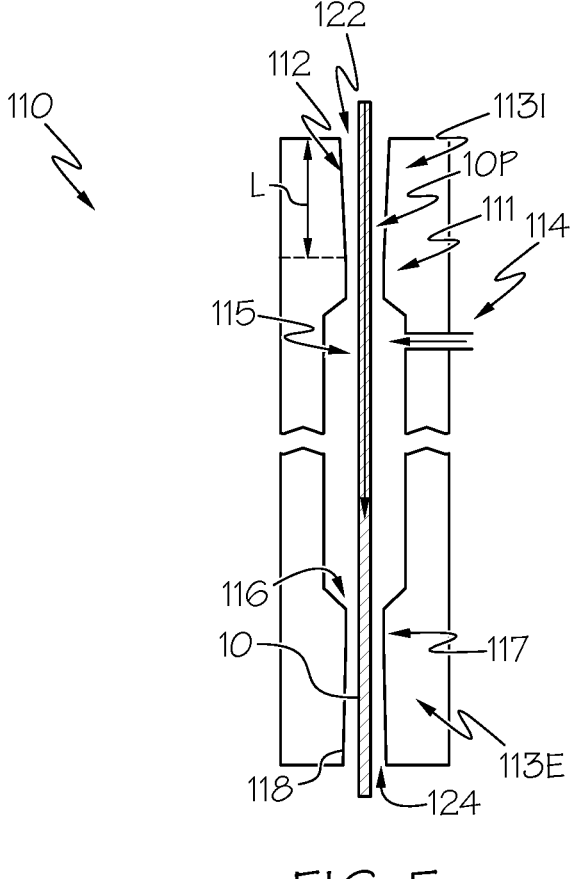
FIG. 5 schematically illustrates an example pressure device according to one or more embodiments described and illustrated herein.

Referring now to FIG. 5, an example pressure device 110 is schematically illustrated. The example pressure device 110 includes an inlet nozzle 113I, a pressure chamber 115, a gas (e.g. air) supply inlet 114, and an exit nozzle 113E. An exit end 116 of the pressure chamber 115 is provided proximate the exit nozzle 113E.

The inlet nozzle 113I comprises a tapered inlet 112 and an inlet air bearing component 111. The inlet air bearing component 111 is illustrated by the straight portion of the inlet nozzle 113I. The tapered inlet 112 extends from opening 122 of the pressure to the inlet air bearing component 111.

The exit nozzle 113E comprises a tapered exit 118 and an exit air bearing component 117. The exit air bearing component 117 is illustrated by the straight portion of the exit nozzle 113E. The tapered exit 118 extends from the bottom of the exit air bearing component 117 to opening 124 of the pressure device.

The inlet 112 of the inlet nozzle 113I has a low-angle taper (e.g., 0.5° to 2° with reference to a centerline CL of the pressure device 110 as shown in FIG. 7B) to maintain a laminar flow condition for air passing in an upstream direction from the pressure chamber 115 through the inlet nozzle 1131 to opening 122 of the pressure device 110. The inlet 112 also has a length L that reduces the flow speed of air to a degree sufficient to avoid turbulence in the vicinity of the optical fiber 10. The laminar flow condition and avoidance of turbulence minimizes vibrations of the optical fiber 10 to assist in preventing physical contact between the optical fiber 10 and solid surfaces of the pressure device 110. As non-limiting examples, the length L of both the tapered inlet 112 and the tapered exit 118 is in a range of 100 mm to 300 mm, 150 mm to 150 mm, or 200 mm, and a length of the inlet air bearing component and/or the exit air bearing component 117 is in a range of 2 mm to 10 mm.

As the optical fiber 10 passes through the inlet 112, it is still forming. That is, the optical fiber 10 is upstream of the forming point when it enters pressure device 110 and has a diameter that is still evolving and not yet fixed as it passes through inlet 112. In particular, the diameter of the optical fiber 10 decreases in the downstream direction as the optical fiber 10 enters and passes through pressure device 110. As a non-limiting example, the optical fiber 10 may have a diameter at opening 122 of pressure device 110 that is greater than the diameter of the optical fiber 10 at the forming point by at least 1 μm, or at least 5 μm, or at least 10 μm, or at least 15 μm, or in a range from 1 μm to 25 μm, or in a range from 3 μm to 20 μm, or in a range from 5 μm to 20 μm. In one embodiment, the diameter of the optical fiber 10 at the forming point is about 125 μm. In a preferred embodiment, the forming point of the optical fiber 10 is positioned within the pressure chamber 115 so that no change in the diameter of the optical fiber 10 occurs downstream of pressure chamber 115. That is, the pressure device 110 is positioned along the process pathway of the optical fiber 10 such that the forming point of the optical fiber 10 is located within pressure chamber 115.

The inlet air bearing component 111, examples of which are described in more detail below, provide centration forces on the optical fiber 10 to counteract vibration of the optical fiber (that is, displacement of the optical fiber from a centered position) to prevent the optical fiber 10 from contacting any solid surface of the pressure device 110 as it passes through it. It is noted that there is an annular gap between the optical fiber 10 and the inlet air bearing component 111 such that air leakage out of the pressure chamber 115 occurs and is maintained in a laminar flow condition as described above.

As shown in FIG. 5, the pressure chamber 115 has the inlet nozzle 1131 at a first end and the exit nozzle 113E at the second end. The air (or other gas) inlet 114 is fluidly coupled to the pressure chamber 115 and is operable to provide air or another gas to the pressure chamber 115 such that the pressure chamber 115 has a pressure sufficient to influence the structure of optical fiber 10 to reduce attenuation. In some embodiments, the pressure within the pressure chamber 115 is greater than 100 atm, greater than 200 atm, greater than 500 atm, or greater than 1000 atm, or in a range from 100 atm to 2000 atm, or in a range from 300 atm to 1500 atm, or in a range from 500 atm to 1000 atm. In some embodiments, the walls of the pressure chamber 115 are at elevated temperatures (e.g., between 300° C. and 600° C., including endpoints). The elevated temperature of the walls may also assist with minimizing the fiber cooling in the high pressure chamber.

The pressure chamber 115 has an exit end 116 (i.e., a second end) that is tapered toward the exit nozzle 113E. By the time the optical fiber 10 reaches the exit end 116 in a preferred embodiment, it is completely formed and has its ultimate diameter. As a non-limiting example, the fully formed optical fiber 10 has a diameter of 125 μm.

The exit nozzle 113E includes an exit air bearing component 117 and an exit 118. The exit air bearing component 117, similar to the inlet air bearing component 111, provides centration forces on the optical fiber 10 to prevent the optical fiber 10 from contacting any surface of the pressure device 110 as it passes through it. It is noted that there is an annular gap between the optical fiber 10 and the inlet air bearing component 111 such that air leakage out of the pressure chamber 115 in the upstream direction occurs. Similarly, there is an annular gap between the optical fiber 10 and the exit (outlet) air bearing component 117 such that air leakage out of the pressure chamber 115 in the downstream direction occurs. Further, like the inlet air bearing component 111, the exit has a slight gradual taper at an angle (e.g., 0.5° to 2° with reference to a centerline CL of the pressure device 110) to eliminate or substantially reduce turbulence as air flows from pressure chamber 115 in the downstream direction.

FIGS. 6, 7A and 7B illustrate a close-up view of the exit nozzle 113E depicted in FIG. 5. FIG. 7A is a further close-up view of the circled region 7A in FIG. 6, and FIG. 7B is a further close-up view of the circled region 7B in FIG. 6. Inlet nozzle 1131 may be similarly configured as the exit nozzle 113E shown in FIGS. 6, 7A and 7B.

As shown in FIGS. 6 and 7A, the exit nozzle 113E is downstream from the tapered exit end 116 of the pressure chamber 115. The tapered exit end 116 of the pressure chamber 115 is tapered to the diameter of the exit air bearing component 117 of the exit nozzle 113E, which has a very small orifice that is used to restrict flow at the exit end 116 of the pressure chamber 115. In some embodiments, when the diameter of the optical fiber 10 is 125 μm, the inside diameter of the exit air bearing component 117 is less than 150 μm, less than 145 μm, or less than 140 μm. The diameter of the exit air bearing component 117 provides a gap G between the wall 119 of the exit nozzle 113E and the optical fiber 10, where the gap G has a width equal to half the difference between the inside diameter of exit air bearing component 117 and the diameter of optical fiber 10 when the optical fiber 10 is centered. In various embodiments the gap G has a width less than 20 μm, or less than 15 μm, or less than 10 μm, or in a range from 5 μm to 20 μm, or in a range from 7 μm to 15 μm when the optical fiber 10 is centered. When the optical fiber 10 is displaced from the centerline CL of exit air bearing component 117, the gap G is not constant and varies with azimuthal angle. The gap G varies from a minimum value at one azimuthal angle (which is less than the gap G when the optical fiber 10 is centered) to a maximum value at another azimuthal angle (which is greater than the gap G when the optical fiber 10 is centered).

FIG. 7B shows the end of the tapered exit 118 at opening 124 and thus at the point where the optical fiber 10 emerges from exit nozzle 113E and enters ambient atmosphere A downstream of pressure device 110. The distance H between the wall 121 of the tapered exit 118 at the opening 124 and the optical fiber 10 is equal to the length L of the tapered exit 118 multiplied by the tangent of the taper angle φ. Thus, the length L is measured from the end of the exit air bearing component 117 to the opening 124. As stated above, the tapered exit 118 is tapered to reduce turbulence.

FIG. 8 illustrates a graph 200 showing the mass flow rate of air from pressure chamber 115 into exit nozzle 113E as a function of pressure within the pressure chamber 115 for an exit nozzle 113E having an exit air bearing component 117 with an inside diameter of 145 μm and an optical fiber having a diameter of 125 μm. The values illustrated by FIG. 8 assumes a 10 μm gap between the optical fiber 10 and the exit nozzle 113E wall. In some embodiments, the gas flow rate from pressure chamber to and through the exit nozzle 113E is less than 100 g/min, less than 75 g/min, or less than 50 g/min, or in a range from 10 g/min to 100 g/min, or in a range from 20 g/min to 75 g/min.

As stated above, both the inlet nozzle 1131 and the exit nozzle 113E are configured to have dimensions (length, diameter, taper etc.) such that a centering force is provided to the optical fiber 10 to stabilize the position of the optical fiber 10 and minimize or counteract vibrations of optical fiber 10. The centering force prevents the optical fiber 10 from making physical contact with the nozzles or other component of the pressure device 110.

Figure 9A:
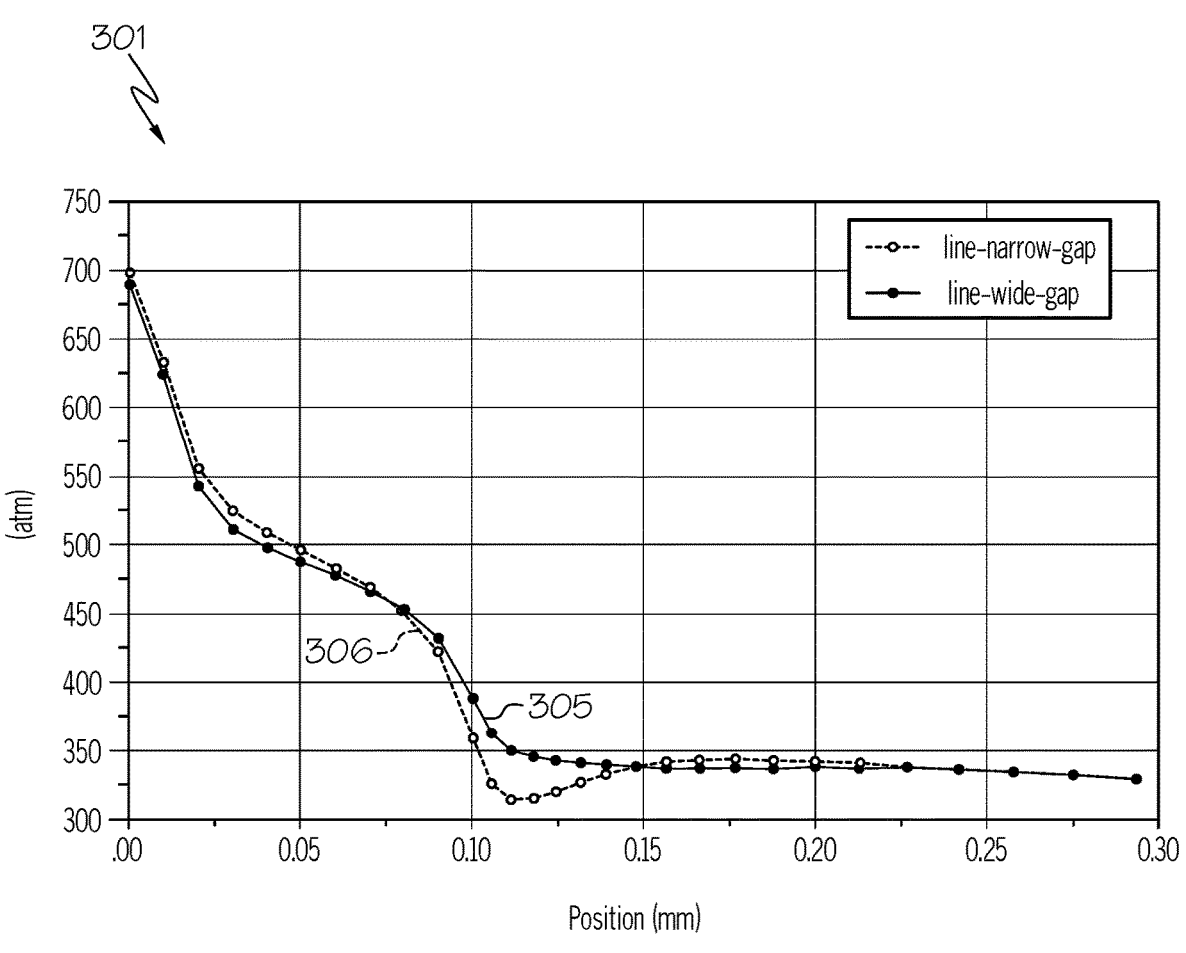
FIGS. 9A and 9B respectively depict a graph showing the pressure force along an axial length of a portion of an exit nozzle and a schematic representation of the portion of the exit nozzle according to one or more embodiments described and illustrated herein.

FIG. 9A provides an illustration of the centering force for an example in which exit nozzle 113E includes exit air bearing component 117 having an inner diameter of 145 μm adjacent to tapered exit end 116 of a pressure chamber 115 maintained at a pressure of 700 atm. Exit air bearing component 117 has an inner diameter of 145 μm and a length of 0.075 mm. The horizontal axis of FIG. 9A shows position along the process pathway relative to the position at which the optical fiber end exits tapered exit end 116 of the pressure chamber 115 and enters exit air bearing component 117.

The centering forces described herein were calculated by a computational model in which the total force component on the fiber along a specified force vector d was computed by summing the dot product of the pressure and viscous forces on each face of the optical fiber with the specified force vector. The terms in this summation represent the pressure and viscous force components in the direction of the vector:

$$F_a = \vec{a} * \vec{F}_p + \vec{a} * \vec{F}_v$$

where, $F_a$: total force component $\vec{a}$: specified force vector $\vec{F}_p$: pressure force vector $\vec{F}_v$: viscous force vector To reduce round-off error, a reference pressure was used to normalize the cell pressure for computation of the pressure force. For example, the net pressure force vector, acting on a wall zone defined by the exterior surface of the optical fiber, is computed as the vector sum of the individual force vectors for each cell face:

$$\vec{F}_p = \sum_{i=1}^{n} (p - p_{ref}) A \hat{n}$$

where n is the number of faces on the fiber mesh, A is the area of the face, and n is the unit normal to the face.

Figure 9B:
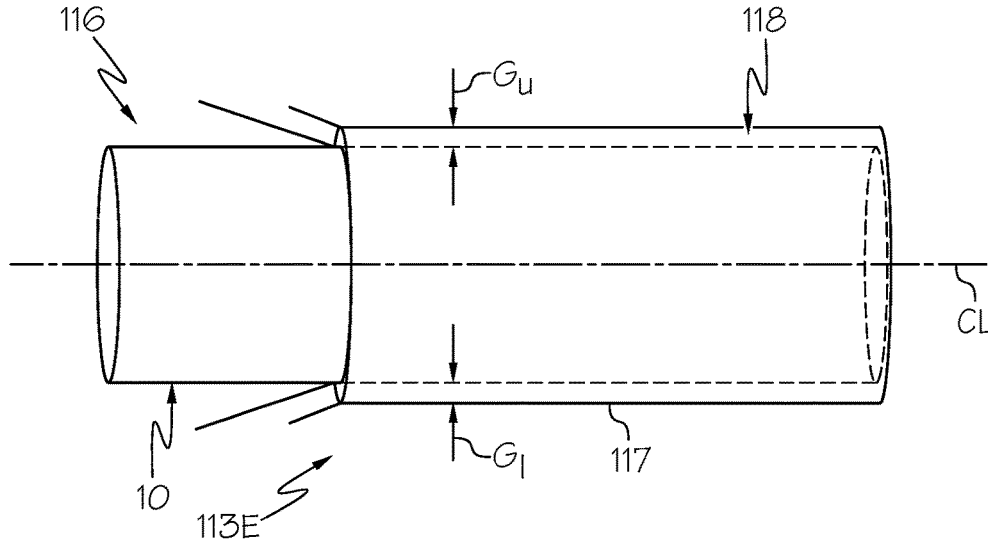

FIG. 9B shows the optical fiber 10 in an off-center position within the exit air bearing component 117. The optical fiber 10 is downstream of its forming point and has a diameter of 125 μm. When centered in exit air bearing component 117, the gap between the optical fiber 10 and the inner wall of the exit air bearing component 117 is 10 μm and is uniform in the azimuthal direction (that is, is uniform about the circumference of optical fiber 10). As shown in the lower part of FIG. 9B, the optical fiber 10 is displaced from a centered position. More specifically, the optical fiber 10 has been displaced in an upward direction by 4 μm relative to the centerline CL of the exit air bearing component 117. Because of the displacement, the gap $G_u$ between the upper side of the optical fiber 10 and the inner wall of the exit air bearing component 117 has been reduced to 6 μm and the gap $G_l$ between the lower side of the optical fiber 10 and the inner wall of the exit air bearing component 117 has been increased to 14 μm. Because of the difference in gap dimension, the pressure associated with air flow in the gap differs for the upper and lower sides of the optical fiber 10. The air pressure in the gap adjacent the upper part of the optical fiber 10 is shown as trace 305 of graph 301 in FIG. 9 and the air pressure in the gap adjacent to the lower part of optical fiber 10 is shown as trace 306 in FIG. 9.

The noteworthy result shown in FIG. 9A is that the air pressure acting on the displaced optical fiber 10 is greater on the upper side (narrow gap) than on the lower side (wide gap). As a result of the pressure differential, displacement of the optical fiber 10 from a centered position induces changes in the force of the air against the optical fiber 10 that counteract the displacement. That is, as the optical fiber 10 is displaced (e.g. due to vibration or fluctuations in draw tension during draw), the force of air against the portions of the optical fiber 10 that move closer to the inner wall of the exit air bearing component 117 increases and the force of air against the portions of the optical fiber 10 that move away from the inner wall of the exit air bearing component 117 decreases. The difference in force counteracts the displacement and acts to return the optical fiber 10 to a centered position. Analysis of the data shown in FIG. 9A indicates that the centering force was −0.31314 gf (gram force), where the sign convention on force is such that a negative value corresponds to a centering force (that is, a force that acts return an off-center optical fiber to a centered position).

Figure 10:
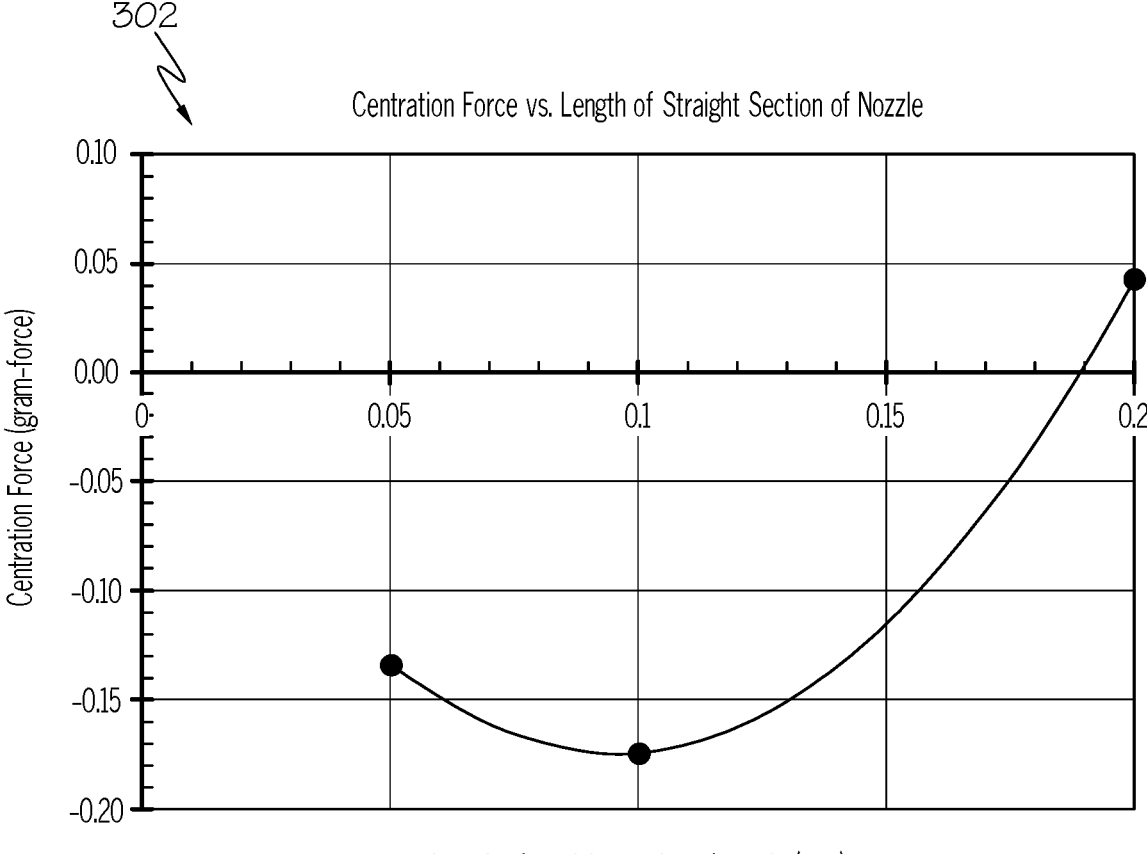
FIG. 10 is a graph plotting the centration force of an optical fiber as a function of the length of the straight air bearing component according to one or more embodiments described and illustrated herein.

FIG. 10 is a graph 302 illustrating the effect of the length of the exit air bearing component 117 of the exit nozzle 113E (i.e., the straight section of the exit nozzle 113E) on the centering force for a pressure chamber 115 having a pressure of 1000 atm. For the analysis, different pressure devices 110 with exit air bearing components 117 having a length of 0.05 mm, 0.1 mm and 0.2 mm were evaluated. For each exit air bearing component 117, the diameter of the exit air bearing component 117 was 145 μm, and the tapered exit 118 had a length of 200 mm and a taper angle of 0.25° with respect to the centerline. The optical fiber 10 in each pressure device 110 had a diameter of 125 μm and was offset from the centerline by 4 μm.

The plot of FIG. 10 is parabolic, thereby showing that there is a maximum centering force that is obtainable by adjusting the length of the exit air bearing component 117 such that the length is at the minimum of the parabola. The centering force increases from a length of near zero to the minimum of the parabola. The centering force decreases for lengths of the exit air bearing component 117 that are longer than the length that provides the minimum of the parabola (i.e., the maximum centering force). Without wishing to be bound by theory, this may be because there is a reversal of the pressure gradient between the narrow gap (e.g., $G_u$ in FIGS. 9A and 9B) and the wide gap (e.g., $G_l$ in FIGS. 9A and 9B) at increasing lengths of the exit air bearing component 117. It is desired to have greater pressure in the narrow gap than the wide gap to push the optical fiber 10 back toward the center. There is a range of lengths of the exit air bearing component 117 that provides such a greater pressure in the narrow gap. Thus, when designing the pressure device to have a maximum centering force to avoid physical contact of the optical fiber 10 with any solid surface of the fiber draw system, the length of the air bearing components for both the inlet nozzle 113I and the exit nozzle 113E should be taken into account.

In the specific example illustrated by FIG. 10, graph 302 shows that that the maximum centering force of about –0.17 gr-force is achieved when the length of the exit air bearing component 117 of the exit nozzle 113E is 0.1 mm. It should be understood that graph 302 of FIG. 10 is non-limiting as it is particular to the design constraints identified above. It is to be expected that the ideal length providing a maximum centering force will be different for pressure devices having different parameters (e.g., a different diameter for the exit air bearing component 117, a different diameter optical fiber 10 and the like).

Figures 11, 12:
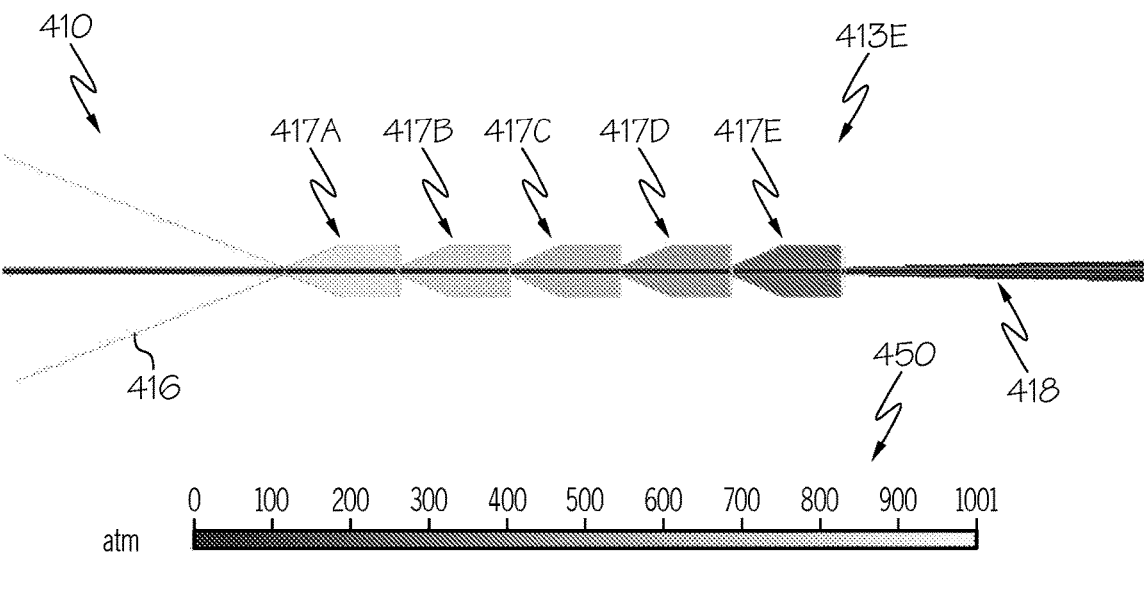
FIG. 11 schematically illustrates static pressure distribution of a multi-nozzle design according to one or more embodiments described and illustrated herein.
FIG. 12 schematically illustrates Mach number distribution in a multi-nozzle design according to one or more embodiments described and illustrated herein.

Rather than a single nozzle provided at an inlet or exit of the pressure chamber, in some embodiments the pressure device comprises a series of nozzles at the exit. FIG. 11 partially illustrates a pressure device 410 having an exit nozzle 413E at an exit end 416 of the pressure chamber that comprises a series of nozzles 417A-417E. The pressure device 410 further includes a tapered exit 418 that leads to ambient pressure outside (downstream) of the pressure device 410. Each nozzle provides a centering force and the series of nozzles act collectively to control the reduction in pressure from the pressure in the pressure chamber of pressure device 410 to atmospheric pressure (downstream of tapered exit 418). FIG. 11 also illustrates in grayscale the static pressure within the nozzles 417A-417E of exit nozzle 413E in an embodiment in which the pressure within the pressure chamber of pressure device 410 is 1000 atm.

Table 1 below shows the centering force at each stage of the multi-nozzle design illustrated by FIG. 11. The negative sign indicates that the force is centering at each stage.

TABLE 1

| Component | Centering Force (gr-force) |
| --- | --- |
| Exit end 416 | –0.21 |
| First nozzle 417A | –0.17 |
| Second nozzle 417B | –0.1 |
| Third nozzle 417C | –0.06 |
| Fourth nozzle 417D | –0.14 |
| Fifth nozzle 417E | –0.18 |
| Exit 418 | –0.04 |

Figure 13:
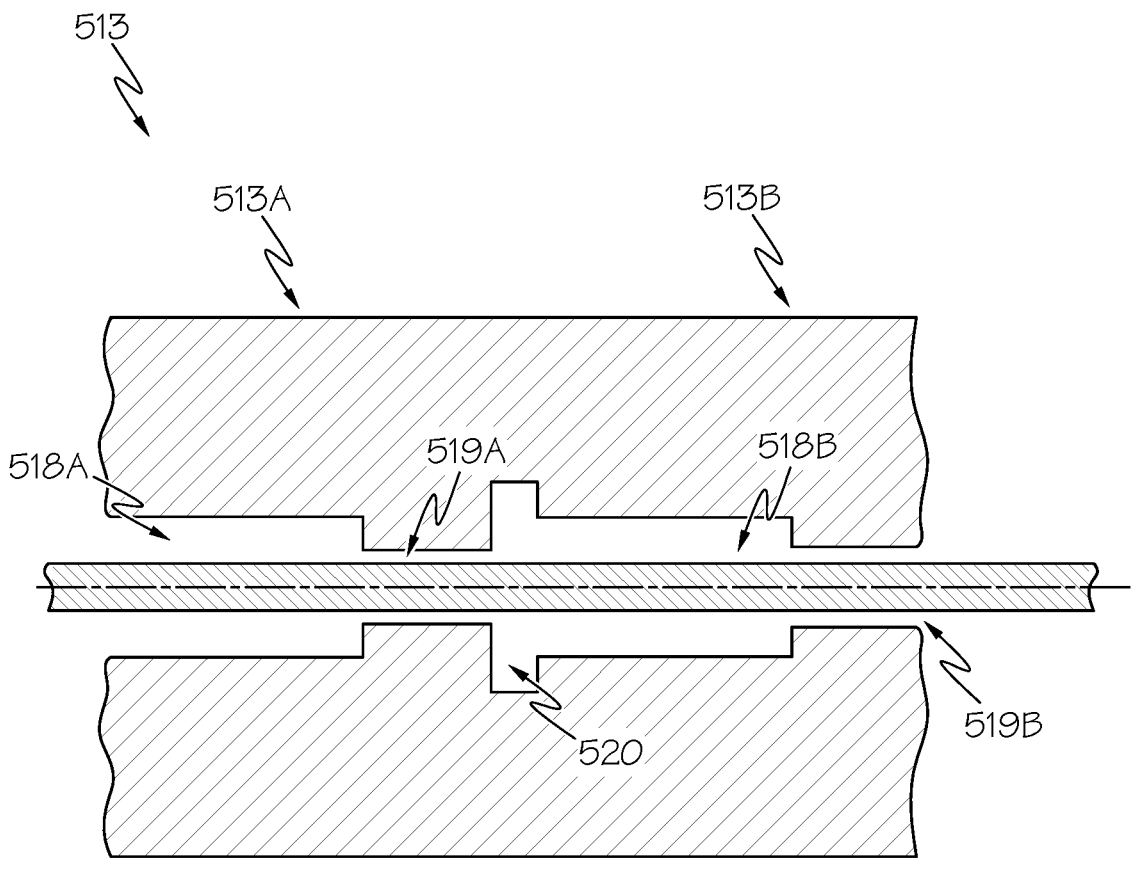
FIG. 13 schematically illustrates a partial view of two step bearings of an exit air bearing component according to one or more embodiments described and illustrated herein.
Figure 14:
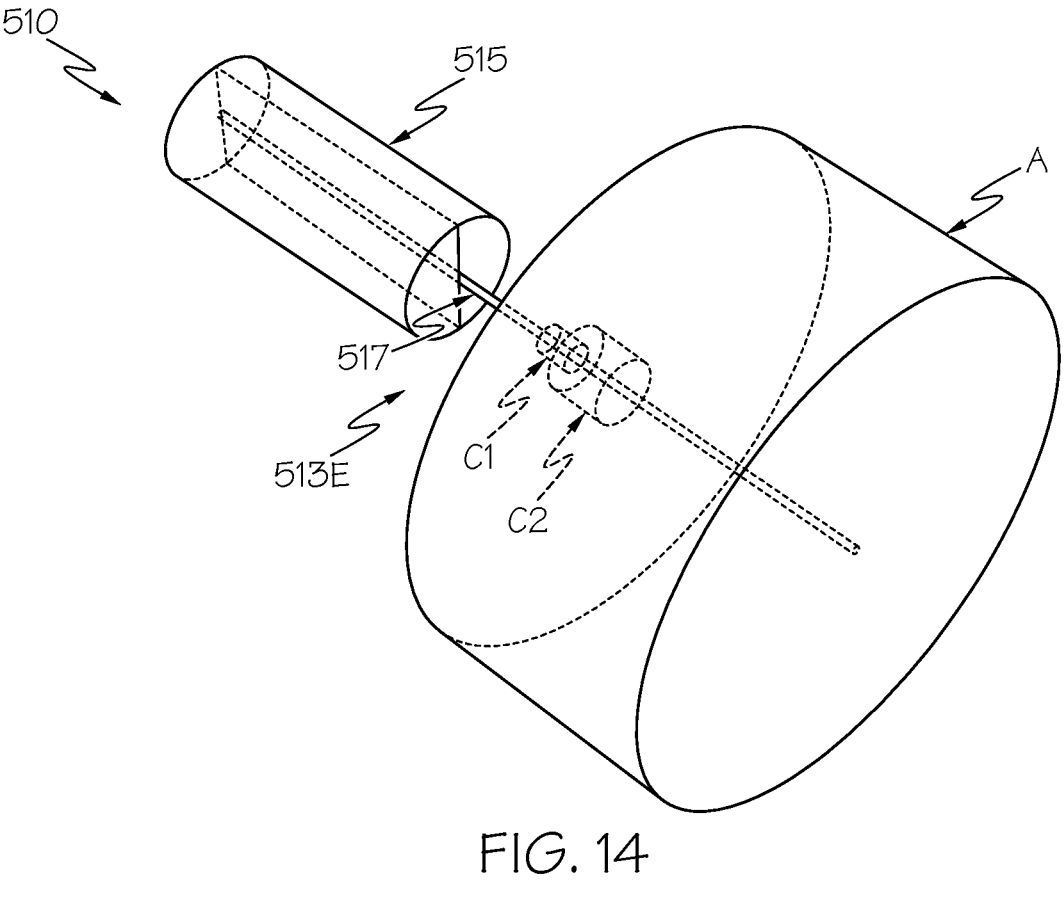
FIG. 14 schematically illustrates a partial perspective view of another pressure device having the step bearings shown in FIG. 13 according to one or more embodiments described and illustrated herein.

Other configurations for the inlet nozzle and the exit nozzle are also possible. FIG. 13 shows an exit nozzle element 513 having a pair of step bearings 513A, 513B that can be included in an exit nozzle 513E and positioned directly adjacent to the exit of a pressure chamber 515 of pressure device 510 (FIG. 14). Step bearing 513A includes section 518A and section 519A. Step bearing 513B includes section 518B and section 519B as shown. A groove 520 is provided between individual step bearings to accept a seal (e.g., an O-ring). One or more of step bearing 513A and/or step bearing 513A can be combined to form exit nozzle component 517.

FIG. 14 shows a partial view of an example pressure device 500 having a pressure chamber 515, an exit nozzle 513E comprising an exit nozzle component 517 defined by a series of ten step bearings of the type shown in FIG. 13 (e.g. step bearing 513A), a first chamber C1, and a second chamber C2. The first chamber C1 has a volume that is less than the second chamber C2. The second chamber C2 is fluidly coupled to ambient atmosphere A. The first and second chambers C1, C2 are utilized to provide a gradual expansion of gas within the pressure device 510 before the optical fiber reaches the ambient atmosphere A. It is noted that FIG. 14 does not explicitly illustrate an inlet nozzle, but an inlet nozzle incorporating step bearings is within the scope of the present disclosure.

Figure 15:
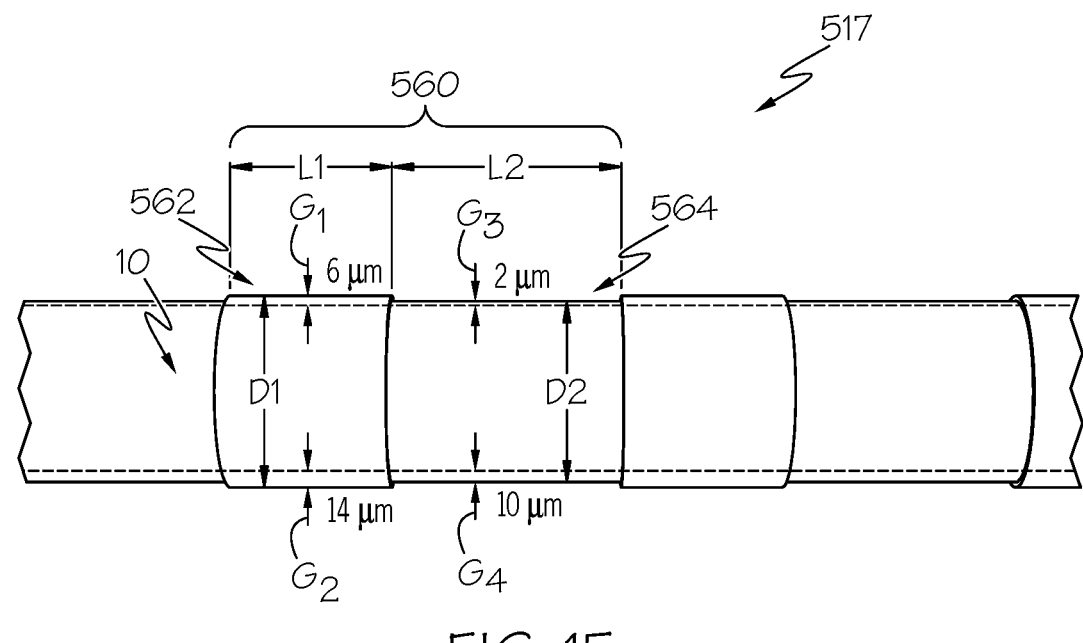
FIG. 15 schematically illustrates a close-up view of step bearings defining an air bearing component according to one or more embodiments described and illustrated herein.

FIG. 15 illustrates a portion of an embodiment of an exit air bearing component 517 formed from a series of ten step bearings of the type depicted as 560. Each step bearing 560 has a first section 562 having a length L1 and an inside diameter D1, and a second segment 564 having a length L2 and an inside diameter D2. For purposes of illustration, the inside diameter D1 of the first section 562 is 145 μm and the inside diameter D2 of the second section 564 is 137 μm. An optical fiber 10 with a diameter of 125 μm is shown in FIG. 15 in an off-center position in the exit air bearing component 517. More specifically, the optical fiber 10 is offset from the center in an upward vertical direction by 4 μm. Gaps $G_1$, $G_2$, $G_3$, and $G_4$ between the optical fiber 10 and the inner walls of sections 562 and 564 of step bearing In the illustrated example, a first gap $G_1$ between the inner surface of the first segment 562 and the upper surface of the optical fiber 10 is 6 μm, a second gap $G_2$ between the inner surface of the first segment 562 and the lower surface of the optical fiber 10 is 14 μm, a third gap $G_3$ between the inner surface of the second segment 564 and the upper surface of the optical fiber 10 is 2 μm, and a fourth gap $G_4$ between the inner surface of the second segment 564 and the lower surface of the optical fiber 10 is 10 μm. It should be understood that the values for the gaps are for illustrative purposes only and are non-limiting.

Figure 16:
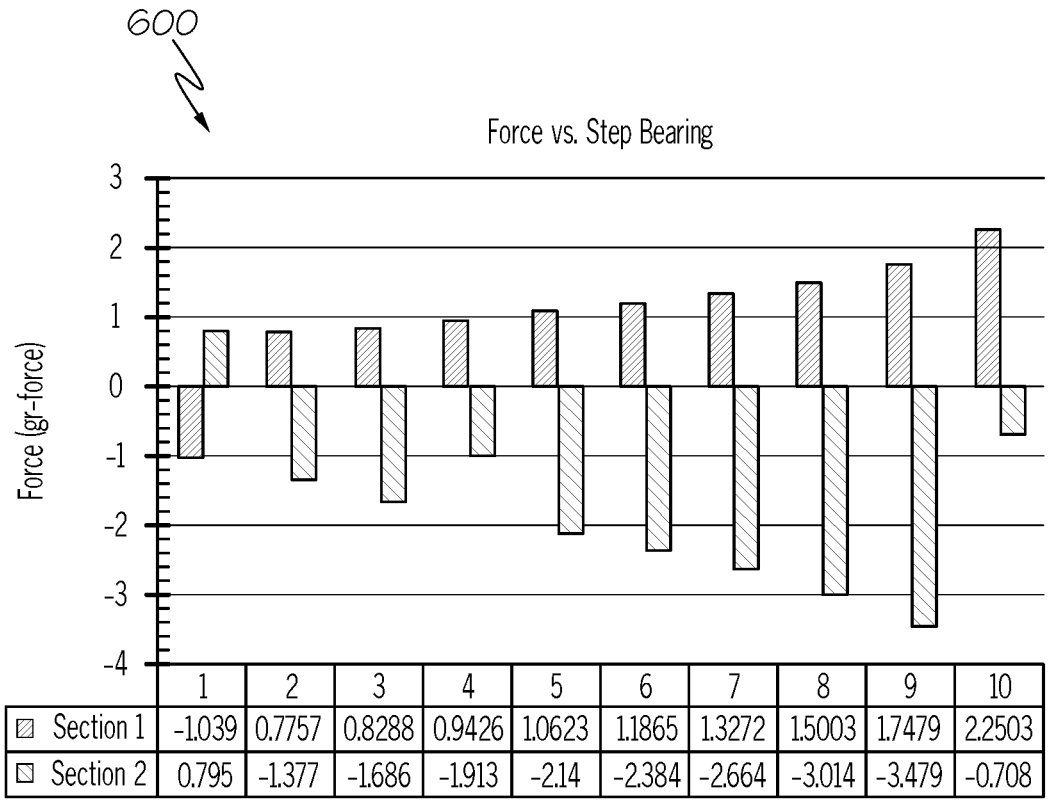
FIG. 16 is a graph showing the centering force in two sections of ten step bearings of an air bearing component according to one or more embodiments described and illustrated herein.

The step bearings 560 provide a centering force on the optical fiber 10 in exit air bearing component 517. FIG. 16 provides a bar graph 600 illustrating a centering force (in units of gr-force (grams force)) for an exit air bearing component 517 consisting of a series ten step bearing 560, where each of the step bearings 560 has a first section length L1 that is 125 μm and a second section length L2 that is 172.5 μm. The mass-flow rate is 0.18 g/s. The y-axis is the centering force in units of gr-force and the x-axis numbers the individual step bearings in the series of ten step bearings of exit nozzle 517. The numbering of the individual step bearings increases in the downstream direction. The first bar for each step bearing 560 is the first section 562 of the step bearing 560 and the second bar for each step bearing 560 is the second section 564 of the step bearing 560. With the exception of the first step bearing, the second section produces a centration force (negative sign) whereas the force in the first section acts in the opposite direction. In step bearings two through nine, the magnitude of the force in the second section is larger than the magnitude of the force in the first section, resulting in a net force that acts to center the optical fiber when the fiber becomes off-center.

Figure 17:
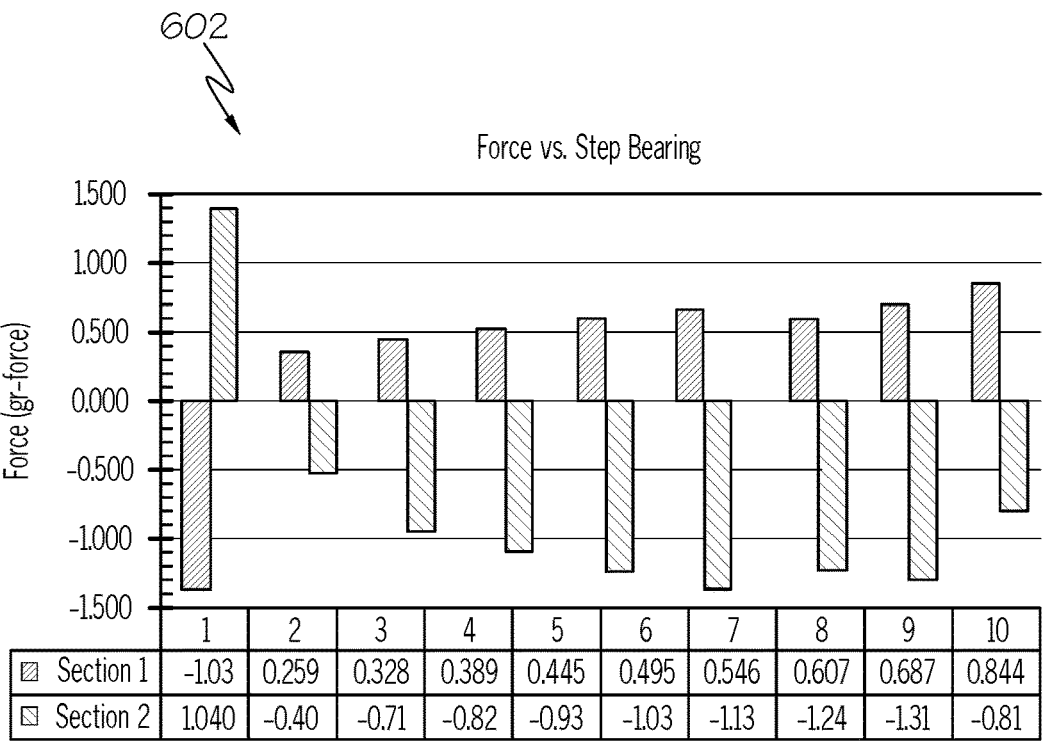
FIG. 17 is a graph showing the centering force in two sections of ten step bearings of another air bearing component according to one or more embodiments described and illustrated herein.

The sensitivity of the centering force was studied for different length first lengths L1 of the step bearings. FIG. 17 is a bar graph 602 illustrating a centering force for an exit air bearing component 517 consisting of a series ten step bearing 560, where each of the step bearings 560 has a first section length L1 that is 50 μm and a second section length L2 that is 172.5 μm, and where D1, D2, fiber diameter and fiber displacement from the center are as described above in reference to FIG. 15. Thus, the first section length L1 (50 μm) of the example of FIG. 17 is shorter than the first section length L1 (125 μm) of the example of FIG. 16.

Figure 18:
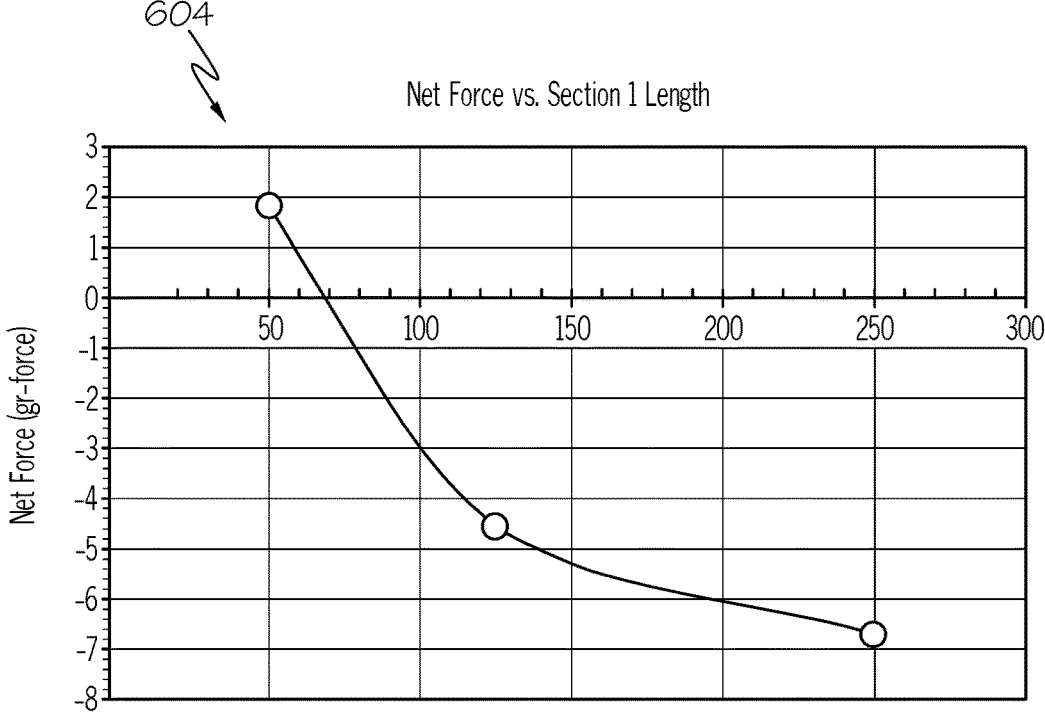
FIG. 18 is a graph showing the centering force as a function of first section length of a step bearing in an air bearing component force in two sections of ten step bearings of an air bearing component according to one or more embodiments described and illustrated herein.
Figure 19A:
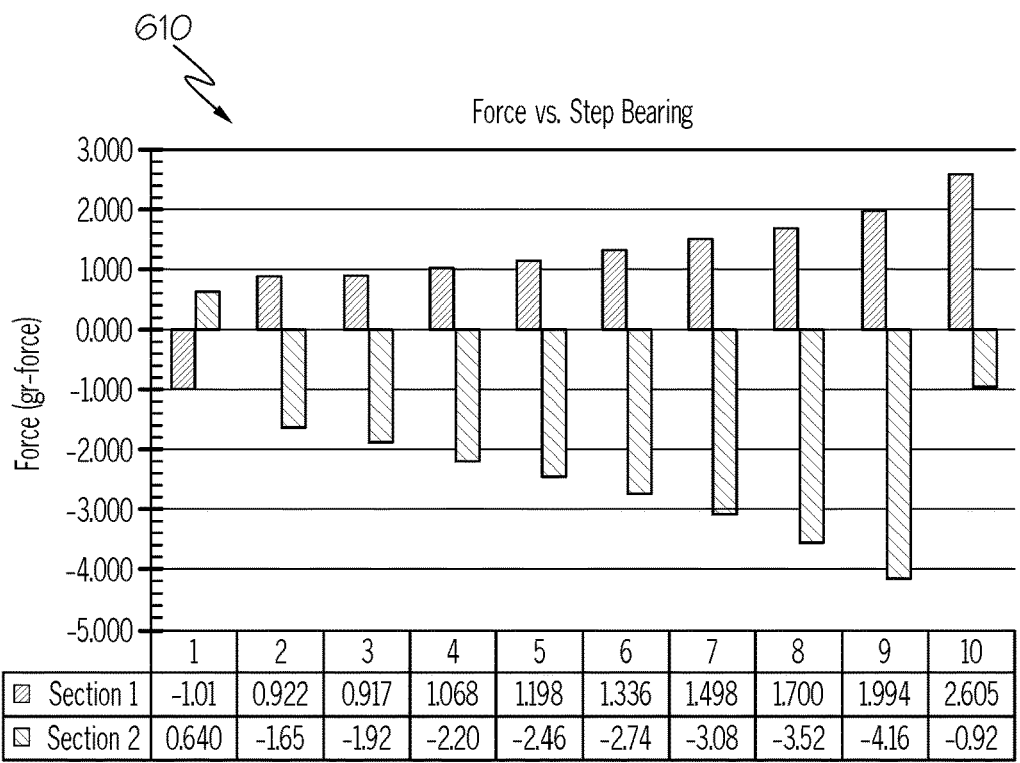
FIGS. 19A-19D are graphs showing the centering force in two sections of ten step bearings of an air bearing component for four different first section diameters force in two sections of ten step bearings of an air bearing component according to one or more embodiments described and illustrated herein.
Figure 19B:
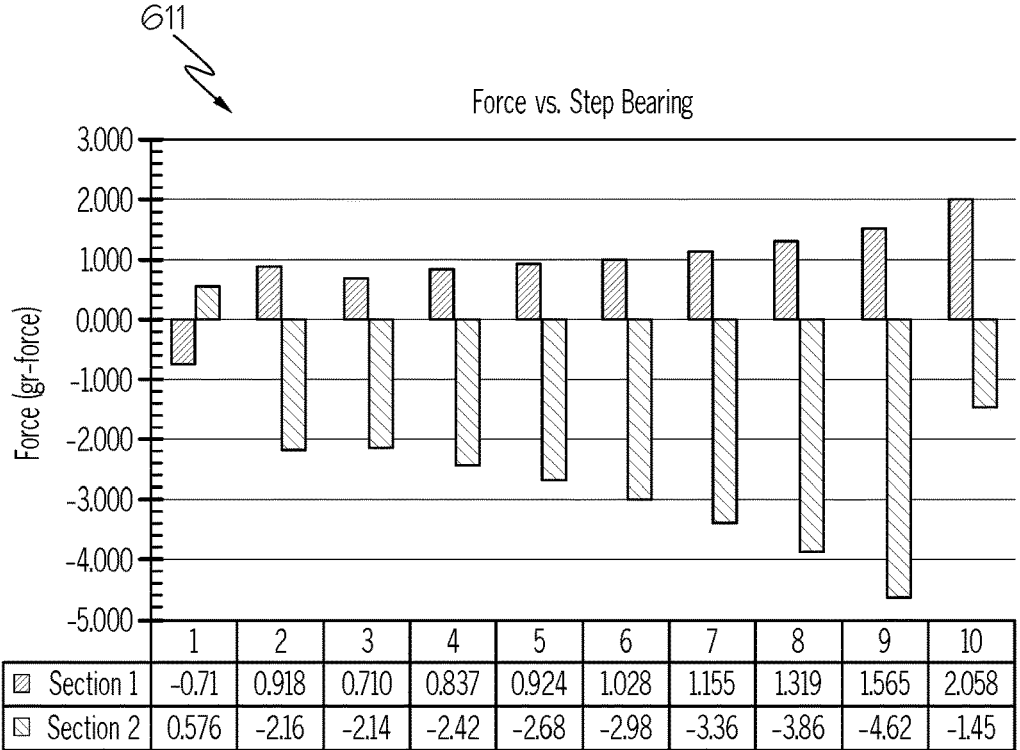
Figure 19C:
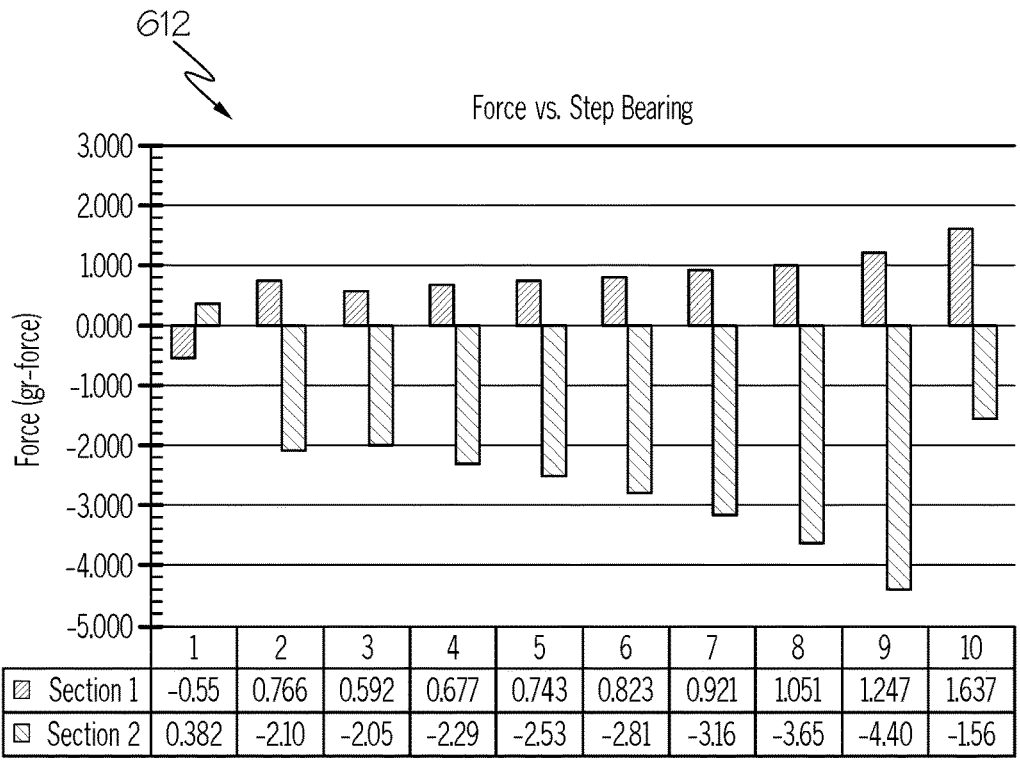
Figure 19D:
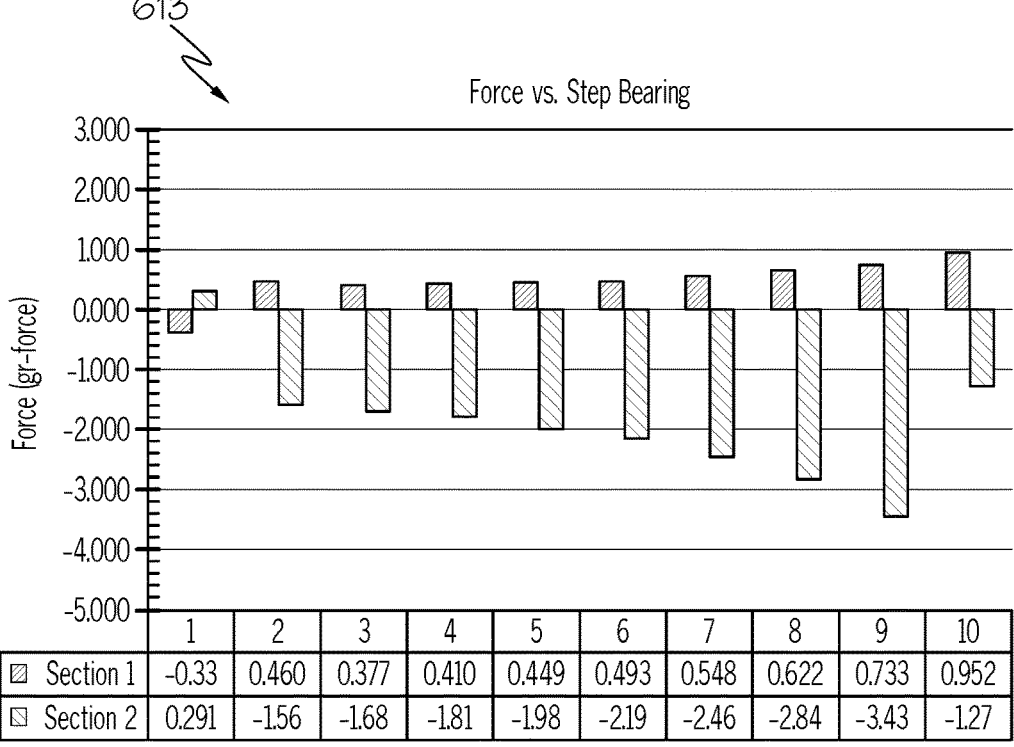

A comparison of the values of FIGS. 16 and 17 shows that by shortening the length of the first section, the force in the first section is reduced, but at the same time the magnitude of the centering force in the second section is also reduced. The net result is a reduction of the magnitude of the net centering force. On the other hand, the net centering force is increased by increasing the length of section 1. FIG. 18 is a graph 604 that shows the net centering force as a function of first section length L1 for an exit air bearing component 517 as otherwise described in connection with FIG. 18. The y-axis is centering force in units of gr-force and the x-axis is the first section length L1. FIGS. 16-18 illustrate that the first section length L1 has a significant impact on centering force and should be considered when designing an inlet air bearing 111 and/or an exit air bearing component 117.

Figure 20:
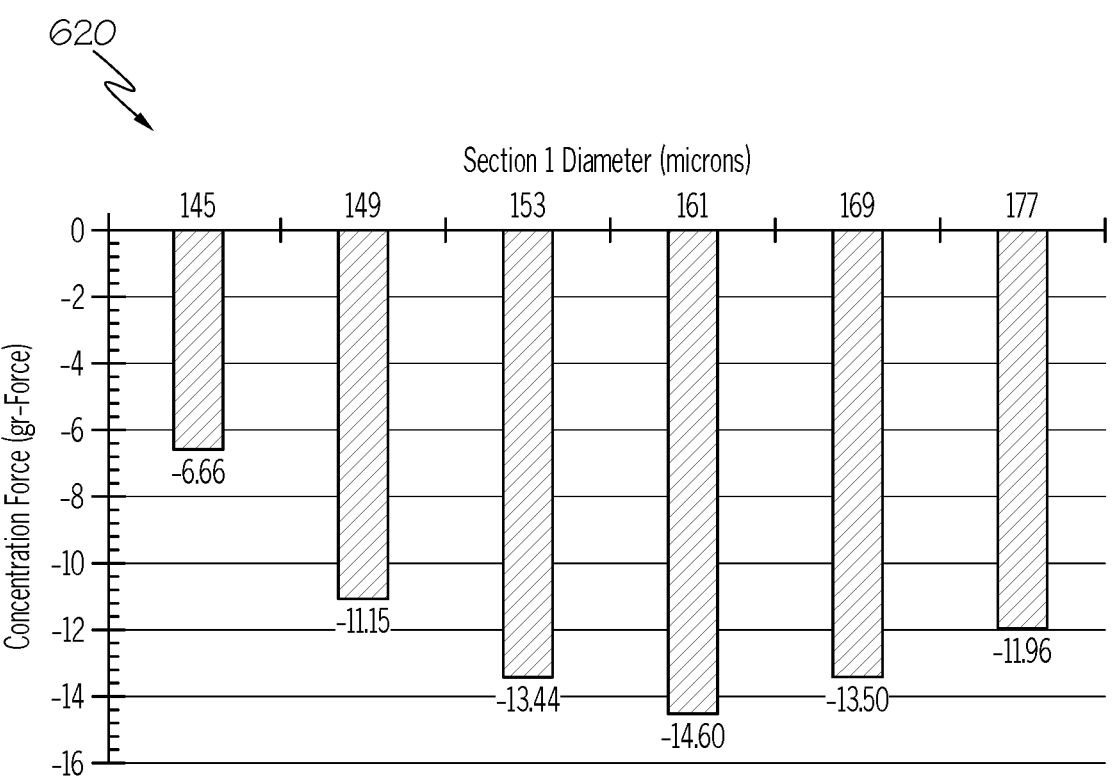
FIG. 20 is a graph showing net centering force for an exit nozzle comprising a series of step bearings as a function of first section diameter force in two sections of ten step bearings of an air bearing component according to one or more embodiments described and illustrated herein.

The diameter of the first section also impacts the centering force. FIGS. 19A-19D illustrate graphs 610-613 showing the force in the first and second sections of an exit nozzle component 517 consisting of a series ten step bearing 560, where each of the step bearings 560 has a first length L1 that is 250 μm and a second length L2 that is 172.5 μm. The diameter D2 of the second section 564 of each step bearing 560 is 137 μm and the diameter D1 of the first section 562 of each step bearing 560 is as indicated in FIGS. 19A-19D. The diameter of the optical fiber remains 125 μm and the displacement from center remains 4 μm. FIG. 20 is a graph 620 that shows the net centering force as a function of the first section diameter obtained from the data of FIGS. 19A-19D. The net centering force for each first section diameter is obtained by taking the average force of the first section 562 and the second section 564 for all of the ten step bearings 560. FIG. 20 shows that a maximum net centration force of about −15 gr-force is achieved when the diameter of the first section 562 is 161 μm. FIGS. 19A-19D and 20 illustrate that the diameter D1 of the first section 562 also has a significant role in centering force and should be considered when designing an inlet air bearing component and/or an exit air bearing component.

These results presented herein indicate that the magnitude of the centration force can be controlled by varying the number and dimensions of step bearings integrated into the inlet air bearing component or the exit air bearing component.

It should now be understood that the pressure devices and methods described herein enable the ability to make optical fibers with higher glass density due to compression of the optical fiber at or near the forming point as well as lower attenuation due to lower Rayleigh scattering coefficient. As non-limiting examples, the glass density of silica-based optical fibers is greater than 2.205 g/cm³, greater than 2.210 g/cm³, or greater than 2.215 g/cm³. As non-limiting examples, the pressure devices and methods described herein enable the production of optical fibers wherein the fiber attenuation is less than 0.14 dB/km at 1550 nm, less than 0.13 dB/km at 1550 nm, or less than 0.12 dB/km at 1550 nm.

For the purposes of describing and defining the embodiments of the present disclosure, it is noted that the terms "approximately" and "substantially" are utilized herein to represent the inherent degree of uncertainty that may be attributed to any quantitative comparison, value, measurement, or other representation. The terms "approximately" and "substantially" are also utilized herein to represent the degree to which a quantitative representation may vary from a stated reference without resulting in a change in the basic function of the subject matter at issue.

It is noted that recitations herein of a component of the embodiments being "configured" in a particular way, "configured" to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that one or more of the following claims utilize the term "wherein" as a transitional phrase. For the purposes of defining the embodiments of the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Although the disclosure has been illustrated and described herein with reference to explanatory embodiments and specific examples thereof, it will be readily apparent to those of ordinary skill in the art that other embodiments and examples can perform similar functions and/or achieve like results. For instance, the connection port insert may be configured as individual sleeves that are inserted into a passageway of a device, thereby allowing the selection of different configurations of connector ports for a device to tailor the device to the desired external connector. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

The invention claimed is:

1. A method of processing an optical fiber comprising:
drawing the optical fiber from a preform through a draw furnace operable to draw the optical fiber from the preform;
directing the optical fiber in a downstream direction along a process pathway, the optical fiber having a forming point at a first position along the process pathway, the optical fiber having a forming point temperature $T_{fp}$ at the forming point; and
passing the optical fiber through a pressure device downstream from the draw furnace and operable to receive the optical fiber from the draw furnace and subject the optical fiber to an applied pressure greater than 10 atm at a second position along the process pathway, the second position upstream of the first position, and the optical fiber having a temperature $T_1$ at the second position,
wherein $T_{fp}-150°$ C. $\leq T_1 \leq T_{fp}+100°$ C.

2. The method of claim 1, wherein $T_{fp}$ is between 1500° C. and 1700° C., including endpoints.

3. The method of claim 1, further comprising directing the optical fiber to a cooling device positioned along the process pathway, the cooling device configured to cool the optical fiber at a rate less than 5000° C./s.

4. The method of claim 3, wherein the optical fiber enters the cooling device at a temperature greater than $T_1-100°$ C.

5. The method of claim 3, wherein a residence time of the optical fiber inside of the cooling device is less than 0.5 seconds.

6. A fiber draw production system comprising:
a draw furnace operable to draw an optical fiber from a preform in a downstream direction along a process pathway, the optical fiber having a forming point at a first position along the process pathway, the optical fiber having a forming point temperature $T_{fp}$ at the forming point; and a pressure device downstream from the draw furnace and operable to receive the optical fiber from the draw furnace and subject the optical fiber to an applied pressure greater than 10 atm at a second position along the process pathway, the second position upstream of the first position, and the optical fiber having a temperature $T_1$ at the second position, wherein $T_{fp}-150°\ C.\leq T_1 \leq T_{fp}+100°\ C.$ 7. The fiber draw production system of claim 6, wherein the fiber draw production system is such that a residence time of the optical fiber within the pressure device is greater than 40 msec.

8. The fiber draw production system of claim 6, wherein the pressure device comprises a pressure chamber, an inlet nozzle at an entrance end of the pressure chamber, and an exit nozzle at an exit of the pressure chamber.

9. The fiber draw production system of claim 8, wherein: the exit nozzle comprises a straight section and a tapered section;

the straight section has a diameter that is less than 150 µm and a length within a range of 50 µm and 150 µm, including end points;

the tapered section has an increasing diameter defined by a taper angle; and a flow rate to the exit nozzle is less than 100 g/min.

10. The fiber draw production system of claim 6, wherein the pressure device comprises at least one nozzle.

11. The fiber draw production system of claim 10, wherein the at least one nozzle comprises a series of step bearings, wherein each step bearing of the series of step bearings comprises a first segment having a first diameter and a first length and a second segment having a second diameter and a second length.

12. The fiber draw production system of claim 11, wherein the first diameter is greater than the second diameter and the first length is shorter than the second length.

13. The fiber draw production system of claim 6, further comprising a cooling device positioned along the process pathway, the cooling device configured to cool the optical fiber at a rate less than 5000° C./s.

14. The fiber draw production system of claim 13, wherein the optical fiber enters the cooling device at a temperature greater than T1-100° C.

15. The fiber draw production system of claim 13, wherein a residence time of the optical fiber inside of the cooling device is less than 0.5 seconds.

16. A pressure device for applying pressure to an optical fiber drawn from a draw furnace along a process pathway, the optical fiber having a forming point at a first position along the process pathway, the optical fiber having a forming point temperature Tip at the forming point, and the pressure device comprising:

a pressure chamber comprising an entrance end and an exit end; an entrance nozzle at the entrance end;

an exit nozzle at the exit end; and an inlet fluidly coupled to the entrance nozzle, wherein:

the pressure device is operable to receive the optical fiber at a second position along the process pathway and subject the optical fiber to an applied pressure greater than 10 atm;

the exit nozzle comprises a straight section and a tapered section;

the straight section has a diameter that is less than 150 µm and a length within a range of 50 µm and 150 µm, including end points;

the tapered section has an increasing diameter defined by a taper angle; and a flow rate to the exit nozzle is less than 100 g/min.

17. The pressure device of claim 16, wherein the exit nozzle comprises a series of nozzles.

18. The pressure device of claim 16, wherein:

at least one of the entrance nozzle and the exit nozzle comprises a series of step bearings; and each step bearing of the series of step bearings comprises a first segment having a first diameter and a first length and a second segment having a second diameter and a second length.

19. The pressure device of claim 18, wherein the first diameter is greater than the second diameter and the first length is shorter than the second length.

20. The pressure device of claim 16, wherein the inlet has a taper angle of less than or equal to 5 degrees.

21. The pressure device of claim 16, wherein:

the second position is upstream of the first position; and the optical fiber having a temperature $T_1$ at the second position; and $T_{fp}-150°\ C.\leq T_1 \leq T_{fp}+100°\ C.$

* * * * *